United States Patent
Tang

(10) Patent No.: US 12,113,749 B2
(45) Date of Patent: Oct. 8, 2024

(54) BANDWIDTH PART PROCESSING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 791 days.

(21) Appl. No.: 17/125,761

(22) Filed: Dec. 17, 2020

(65) Prior Publication Data

US 2021/0105127 A1 Apr. 8, 2021

Related U.S. Application Data

(63) Continuation of application No. PCT/CN2019/092287, filed on Jun. 21, 2019.

(30) Foreign Application Priority Data

Jun. 21, 2018 (CN) .......................... 201810646692.5

(51) Int. Cl.
*H04L 5/00* (2006.01)
*H04L 1/1607* (2023.01)
*H04W 72/0453* (2023.01)
*H04W 72/23* (2023.01)

(52) U.S. Cl.
CPC .......... *H04L 5/0098* (2013.01); *H04L 1/1614* (2013.01); *H04W 72/0453* (2013.01); *H04W 72/23* (2023.01)

(58) Field of Classification Search
None
See application file for complete search history.

(56) References Cited

U.S. PATENT DOCUMENTS

| 2018/0098361 | A1* | 4/2018 | Ji ....................... H04W 74/0866 |
| 2018/0288746 | A1* | 10/2018 | Zhang ................... H04L 1/0031 |
| 2018/0317213 | A1* | 11/2018 | Islam .................... H04L 1/1614 |
| 2018/0343154 | A1* | 11/2018 | Park ..................... H04L 5/0007 |
| 2019/0053103 | A1* | 2/2019 | Manolakos ........... H04L 5/0048 |
| 2019/0103954 | A1 | 4/2019 | Lee et al. |

(Continued)

FOREIGN PATENT DOCUMENTS

| CN | 108135028 A | 6/2018 |
| CN | 109788558 A * | 5/2019 |

(Continued)

OTHER PUBLICATIONS

3GPP TSG RAN WG1 Meeting #90, Huawei, "Bandwidth part activation and adaptation." Prague, Czech Republic, Aug. 21-25, 2017.*

(Continued)

*Primary Examiner* — Andrew C Oh
(74) *Attorney, Agent, or Firm* — Perkins Coie LLP

(57) ABSTRACT

A bandwidth part processing method is provided. The method comprises: a terminal device receiving control information; and the terminal device deactivating and/or activating a bandwidth part on the basis of the control information. Also disclosed are another bandwidth part processing method, a terminal device, a network device and a storage medium.

6 Claims, 9 Drawing Sheets

(56) References Cited

U.S. PATENT DOCUMENTS

| | | | |
|---|---|---|---|
| 2019/0373667 A1* | 12/2019 | Jeon | H04L 5/001 |
| 2020/0059345 A1* | 2/2020 | Pelletier | H04B 7/00 |
| 2020/0077432 A1* | 3/2020 | Xiong | H04L 27/26025 |
| 2020/0229152 A1* | 7/2020 | Park | H04L 5/0044 |
| 2020/0252180 A1* | 8/2020 | Takeda | H04W 72/12 |
| 2020/0274678 A1* | 8/2020 | Lin | H04L 5/0092 |
| 2020/0274750 A1* | 8/2020 | Yi | H04L 27/2613 |
| 2020/0280423 A1* | 9/2020 | Tang | H04L 1/0027 |
| 2020/0295913 A1* | 9/2020 | Takeda | H04L 5/001 |
| 2020/0336227 A1* | 10/2020 | Takeda | H04B 17/327 |
| 2020/0358586 A1* | 11/2020 | Takeda | H04W 72/0453 |
| 2020/0374844 A1* | 11/2020 | Takeda | H04L 27/2602 |
| 2020/0396686 A1* | 12/2020 | Tiirola | H04W 52/0229 |
| 2020/0403763 A1* | 12/2020 | Takeda | H04L 5/001 |
| 2021/0007132 A1* | 1/2021 | Jiang | H04W 74/008 |
| 2021/0014008 A1* | 1/2021 | Takeda | H04L 1/0001 |
| 2021/0058218 A1* | 2/2021 | Harada | H04L 5/0098 |
| 2021/0075581 A1* | 3/2021 | Takeda | H04L 5/0094 |
| 2021/0092622 A1* | 3/2021 | Tiirola | H04L 1/0038 |
| 2021/0099902 A1* | 4/2021 | Takeda | H04W 24/10 |
| 2021/0185641 A1* | 6/2021 | Yang | H04L 5/001 |
| 2021/0204231 A1* | 7/2021 | Harada | H04L 5/001 |
| 2021/0227568 A1* | 7/2021 | Harada | H04W 72/23 |
| 2021/0243761 A1* | 8/2021 | Yoshioka | H04W 72/53 |
| 2021/0274534 A1* | 9/2021 | Takeda | H04L 5/0053 |

FOREIGN PATENT DOCUMENTS

| | | | | |
|---|---|---|---|---|
| CN | 110138500 A | * | 8/2019 | H04L 1/0038 |
| WO | 2016130175 A1 | | 8/2016 | |
| WO | 2018084571 A1 | | 5/2018 | |
| WO | 2018085145 A1 | | 5/2018 | |
| WO | 2019070579 A1 | | 4/2019 | |
| WO | WO-2019136676 A1 | * | 7/2019 | |
| WO | WO-2019169588 A1 | * | 9/2019 | H04L 5/001 |
| WO | WO-2019227467 A1 | * | 12/2019 | H04B 7/022 |

OTHER PUBLICATIONS

First Office Action of the Chinese application No. 202110113856.X, issued on Jul. 27, 2022. 14 pages with English translation.
Second Office Action of the European application No. 19821531.1, issued on Sep. 13, 2022. 6 pages.
Second Office Action of the Chinese application No. 202110113856.X, issued on Nov. 1, 2022. 13 pages with English translation.
First Office Action of the European application No. 19821531.1, issued on Mar. 29, 2022. 6 pages.
Office Action of the Indian application No. 202127000775, issued on Jan. 4, 2022. 5 pages with English translation.
Decision of Rejection of the Chinese application No. 202110113856.X, issued on Jan. 28, 2023. 9 pages with English translation.
3GPP TSG-RAN WG2 NR #99bis Meeting R2-1711189, Prague, Czech, 951-131h Oct. 2017, Agenda item: 10.2.3, source: Samsung, Title: Activation/deactivation of bandwidth parts in NR, Document for: Discussion & Decision. 5 pages.
Supplementary European Search Report in the European application No. 19821531.1, mailed on Jun. 30, 2021. 11 pages.
Written Opinion of the International Search Authority in the international application No. PCT/CN2019/092287, mailed on Aug. 27, 2019. 6 pages with English translation.
Huawei et al. "Bandwidth part activation and adaptation" 3GPP TSG RAN WG1 Meeting #90bis R1-1717905, Oct. 13, 2017 (Oct. 13, 2017), section 2.1.
Huawei et al. "Bandwidth part activation and adaptation" 3GPP TSG RAN WG1 Meeting #91 R1-1719828, Dec. 1, 2017 (Dec. 1, 2017), section 2.1.
International Search Report in the international application No. PCT/CN2019/092287, mailed on Aug. 27, 2019.
First Office Action of the Japanese application No. 2020-570733, issued on Apr. 25, 2023. 6 pages with English translation.
3GPP TSG RAN WG1 NR Ad-Hoc Meeting R1-1711424, Qingdao, China, Jun. 27-30, 2017, Agenda Item: 5.1.11, Source: Huawei, HiSilicon, Title: On bandwidth adaptation, Document for: Discussion and decision. 5 pages.
3GPP TSG RAN WG1 Meeting #90 R1-1712155, Prague, Czech Republic, Aug. 21-25, 2017, Agenda Item: 6.1.3.3.9, Source: Huawei, HiSilicon, Title: Bandwidth part activation and adaptation, Document for: Discussion and decision. 5 pages.
3GPP TSG RAN WG1 Meeting NR#3 R1-1715642, Nagoya, Japan, Sep. 18-21, 2017, Source: vivo, Title: On DL/UL resource allocation, Agenda Item: 6.3.3.1, Document for: Discussion and Decision. 8 pages.
3GPP TSG RAN WG1 Meeting #91 R1-1720694, Reno, NV, USA, Nov. 27-Dec. 1, 2017, Agenda item: 7.3.4.2, Source: Qualcomm Incorporated, Title: Open Issues on CA, Document for: Discussion/Decision. 14 pages.
First Office Action of the Australian application No. 2019290737, issued on Jan. 5, 2024. 3 pages.

* cited by examiner

BANDWIDTH PART PROCESSING METHOD, TERMINAL DEVICE AND NETWORK DEVICE

CROSS-REFERENCE TO RELATED APPLICATION

This is a continuation application of International Patent Application No. PCT/CN2019/092287, filed on Jun. 21, 2019, which claims priority to Chinese Patent Application No. 201810646692.5, filed to the Patent Office of the People's Republic of China on Jun. 21, 2018, entitled "Bandwidth Part Processing Method, Terminal Device and Network Device", the disclosure of which is hereby incorporated by reference in their entireties.

BACKGROUND

In a 5th Generation (5G) New Radio (NR) system, a system bandwidth is greatly increased, and thus a bandwidth for transmission of a terminal may occupy a part of the system bandwidth only. For implementing allocation of frequency-domain resources in a range smaller than the system bandwidth, BWP is introduced.

In the related art, only one BWP may be activated for a terminal device, which cannot implement flexible BWP configuration.

SUMMARY

The disclosure relates to the technical field of wireless communication, and particularly to a method for processing Bandwidth Parts (BWPs), a terminal device and a network device.

Embodiments of the disclosure provide a method for processing BWPs. A terminal device may perform activation processing or deactivation processing on the BWPs according to control information sent by a network device to implement flexible BWP configuration.

In a first aspect, there is provided a method for processing BWPs. The method includes that: a terminal device receives control information; and the terminal device performs deactivation processing and/or activation processing on the BWPs based on the control information.

In a second aspect, there is provided a method for processing BWPs. The method includes that: a network device sends control information, the control information being configured for a terminal device to perform deactivation processing and/or activation processing on the BWPs.

In a third aspect, there is provided a terminal device, which is configured to execute the method in the first aspect or each implementation manner thereof. Specifically, the terminal device includes function modules which are configured to execute the method in the first aspect or each implementation manner thereof.

In a fourth aspect, there is provided a network device, which is configured to execute the method in the second aspect or each implementation manner thereof. Specifically, the network device includes functional modules which are configured to execute the method in the second aspect or each implementation manner thereof.

In a fifth aspect, there is provided a terminal device, which may include a processor and a memory. The memory may be configured to store a computer program, and the processor may be configured to call and run the computer program stored in the memory to execute the method in the first aspect or each implementation manner thereof.

In a sixth aspect, there is provided a network device, which may include a processor and a memory. The memory may be configured to store a computer program, and the processor may be configured to call and run the computer program stored in the memory to execute the method in the second aspect or each implementation manner thereof.

In a seventh aspect, there is provided a chip, which is configured to implement the method in any aspect of the first aspect or the second aspect or each implementation manner thereof.

Specifically, the chip includes a processor, which is configured to call and run a computer program in a memory to enable a device installed with the chip to execute the method in any aspect of the first aspect or the second aspect or each implementation manner thereof.

In an eighth aspect, there is provided a computer-readable storage medium, which is configured to store a computer program, the computer program enabling a computer to execute the method in any aspect of the first aspect or the second aspect or each implementation manner thereof.

In a ninth aspect, there is provided a computer program product, which includes a computer program instruction, the computer program instruction enabling a computer to execute the method in any aspect of the first aspect or the second aspect or each implementation manner thereof.

In a tenth aspect, there is provided a computer program. When running on a computer, the computer program enables the computer to execute the method in any aspect of the first aspect or the second aspect or each implementation manner thereof.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
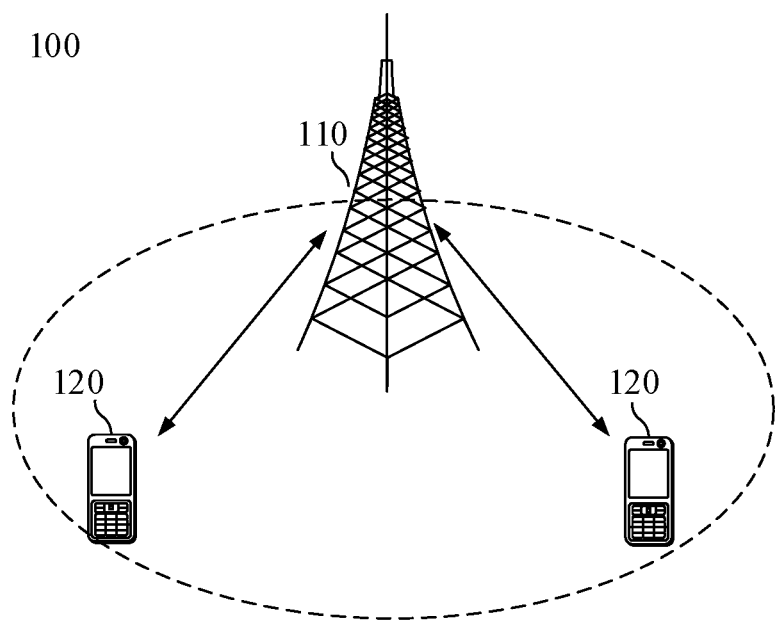
FIG. 1 is a schematic diagram of an architecture of a communication system according to an embodiment of the disclosure.

Exemplarily, a communication system 100 that the embodiments of the disclosure are applied to is illustrated in FIG. 1. The communication system 100 may include a network device 110, and the network device 110 may be a device communicating with a terminal device 120 (or called a communication terminal and a terminal). The network device 110 may provide communication coverage for a specific geographical region and may communicate with a terminal device located in the coverage region. Optionally, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 located within the coverage range of the network device 110. A "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network and/or through a wireless interface, for example, for a cellular network, a Wireless Local Area Network (WLAN), a digital television network such as a Digital Video Broadcasting-Handheld (DVB-H) network, a satellite network and an Amplitude Modulated (AM)-Frequency Modulated (FM) broadcast transmitter, and/or an apparatus arranged to receive/send communication signals of another communication terminal, and/or an Internet of Things (IoT) device. The terminal device arranged to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform Device to Device (D2D) communication.

Optionally, the 5G system or the 5G network may also be called an NR system or an NR network.

One network device and two terminal devices are exemplarily illustrated in FIG. 1. Optionally, the communication system 100 may include a plurality of network devices, and another number of terminal devices may be included in coverage range of each network device. There are no limits made thereto in the embodiments of the disclosure.

Optionally, the communication system 100 may further include another network entity such as a network controller and a mobility management entity. There are no limits made thereto in the embodiments of the disclosure.

It is to be understood that a device with a communication function in the network/system in the embodiments of the disclosure may be called a communication device. Taking the communication system 100 illustrated in FIG. 1 for an example, communication devices may include the network device 110 and terminal device 120 with the communication function. The network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
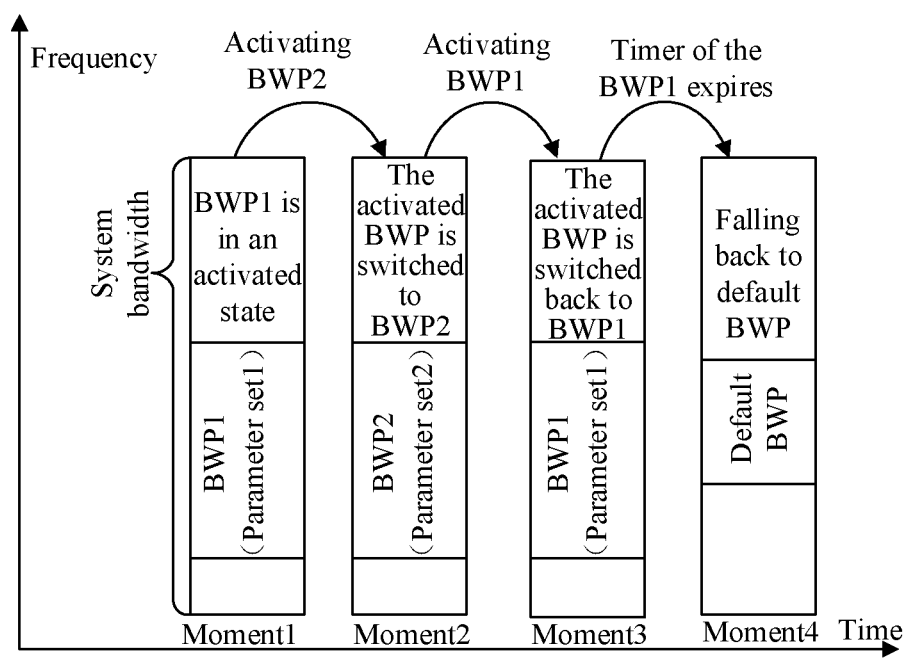
FIG. 2 is a schematic diagram of a BWP activation process according to the disclosure.

When implementing a BWP activation solution, the inventor finds that, in the related art, a network device may configure a plurality of BWPs for a terminal through Radio Resource Control (RRC) signaling and dynamically activate a certain BWP in Downlink Control Information (DCI); and only one BWP may be activated for a terminal, and when activating a new BWP, a BWP activated before may be deactivated. FIG. 2 illustrates the BWP activation process in the related art. When a BWP1 is in an activated state, if a BWP2 is to be activated, the BWP1 may be deactivated. When a new BWP is activated, a timer of the activated BWP may be reset at the same time. When the timer expires, the BWP may fall back to a default BWP. For example, in FIG. 2, the BWP1 is activated at a moment 3, but the timer expires, then the BWP falls back to the default BWP.

Figure 3:
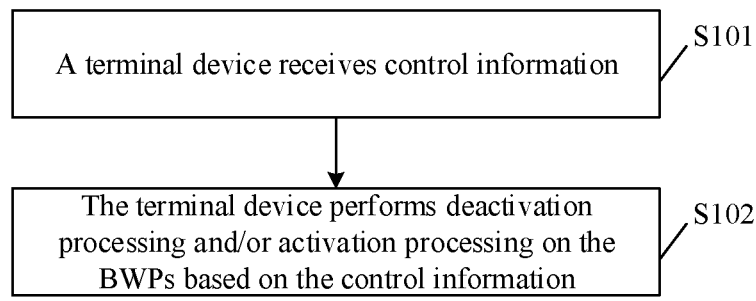
FIG. 3 is a schematic diagram of an optional processing flowchart of a method for processing BWPs which is applied to a terminal device according to an embodiment of the disclosure.

FIG. 3 is a schematic diagram of an optional processing flowchart of a method for processing BWPs which is applied to a terminal device according to an embodiment of the disclosure. The method includes the following steps.

In S101, a terminal device receives control information.

In the embodiment of the disclosure, the terminal device receives the control information sent by a network device.

In S102, the terminal device performs deactivation processing and/or activation processing on the BWPs based on the control information.

Herein, the BWPs include a first BWP and a second BWP. The first BWP is in an activated state, and the second BWP is in a non-activated state.

In the embodiment of the disclosure, the terminal device performs activation processing on the second BWP based on the control information. Or the terminal device, based on the control information, performs activation processing on the second BWP and performs deactivation processing on the first BWP. Or the terminal device performs deactivation processing on the first BWP based on the control information.

In the embodiment of the disclosure, when the terminal device activates at least two BWPs, use of at least two types of parameter sets is supported. Therefore, when a plurality of types of services are transmitted in parallel, parameter sets may be optimized for different services respectively, which achieves higher flexibility in scheduling and increases the service processing speed. Moreover, when the BWPs are switched, the terminal may continue transmitting data, which avoids waste of a spectrum resource.

Optional Embodiment 1

In S201, a terminal device receives DCI sent by UE.

Herein, the DCI carries a second BWP index, the DCI further carries first indication information. The first indication information is configured to indicate whether to deactivate a first BWP when activating a second BWP.

In some embodiments, the first indication information includes a first information field, and a value of the first information field is configured to indicate whether to deactivate the first BWP when activating the second BWP. Optionally, the first information field is 1-bit.

In S202, when a value of a first information field is a first value, the terminal device performs deactivation processing on a first BWP when performing activation processing on a second BWP, and when the value of the first information field is a second value, the terminal device does not perform deactivation processing on the first BWP when performing activation processing on the second BWP.

If the terminal device does not perform deactivation processing on the first BWP when performing activation processing on the second BWP, both the first BWP and the second BWP are in an activated state. In such a manner, at least two BWPs are simultaneously activated to support use of at least two types of parameter sets. Therefore, when a plurality of types of services are transmitted in parallel, parameter sets may be optimized for different services respectively, which achieves higher flexibility in scheduling and increases the service processing speed. Moreover, when the BWPs are switched, the terminal may continue transmitting data, which avoids waste of a spectrum resource.

Herein, the first value may be set to be 0, and the second value may be set to be 1. Of course, the first value may be set to be 1, and the second value may be set to be 0.

In some embodiments, specific implementation manner of performing deactivation processing on the first BWP includes one of the following manners.
1) Deactivation processing is performed on the first BWP with an earliest activation time.
2) Deactivation processing is performed on the first BWP with a highest BWP index value.
3) Deactivation processing is performed on the first BWP with a lowest BWP index value.
4) Deactivation processing is performed on the first BWP with a minimum bandwidth.
5) Deactivation processing is performed on the first BWP with a maximum bandwidth.
6) Deactivation processing is performed on the first BWP bearing the DCI.
7) Deactivation processing is performed on the first BWP meeting a deactivation condition.

The deactivation condition may be a specific parameter set. For example, there are presently three activated BWPs which correspond to subcarrier spacings 15 KHz, 15 KHz and 60 KHz respectively. When a value of a bit, configured to indicate whether to deactivate the first BWP when activating the second BWP, in the DCI is 0, a BWP set corresponding to the subcarrier spacing 15 KHz is deactivated. The terminal device performs deactivation processing on the two BWPs corresponding to the subcarrier spacing 15 KHz in the three activated BWPs. Specifically, the deactivation condition may be pre-configured or may be configured by a network. For example, the network configures a corresponding relationship between deactivation conditions and values of a first information field, as shown in Table 1.

When the value of the first information field is 00, it is indicated that all BWPs corresponding to the subcarrier spacing 15 KHz are deactivated. When the value of the first information field is 10, it is indicated that all BWPs corresponding to the subcarrier spacings 15 KHz and 30 KHz are deactivated. When the value of the first information field is 11, it is indicated that no BWP is deactivated.

TABLE 1

| Value of first information field | Deactivation of BWP corresponding to specific parameter set (subcarrier spacing) |
|---|---|
| 00 | 15 KHz |
| 01 | 30 KHz |
| 10 | 15 KHz and 30 KHz |
| 11 | No BWP is deactivated |

Optional Embodiment 2

In S301, a terminal device receives DCI sent by UE.

Herein, the DCI carries a BWP index, the DCI further carries second indication information. The second indication information is configured to indicate activating a second BWP corresponding to the BWP index carried in the DCI or deactivating a first BWP corresponding to the BWP index carried in the DCI.

The first BWP is in an activated state, and the second BWP is in a non-activated state.

In some embodiments, the second indication information includes a second information field, and a value of the second information field is configured to indicate activating the second BWP or deactivating the first BWP. Optionally, the second information field is 1-bit.

In the embodiment of the disclosure, the DCI further carries the BWP index. When the value of the second information field is 0, it is indicated that activation processing is performed on the BWP which corresponds to the BWP index carried in the DCI. When the value of the second information field is 1, it is indicated that deactivation processing is performed on the BWP which corresponds to the BWP index carried in the DCI.

In S302, when a value of a second information field is a first value, the terminal device performs activation processing on a second BWP which corresponds to a BWP index carried in the DCI, and when the value of the second information field is a second value, the terminal device performs deactivation processing on a first BWP which corresponds to the BWP index carried in the DCI.

Herein, the first value is set to be 0, and the second value is set to be 1.

Preferred Embodiment 3

In S401, a terminal device receives DCI sent by a network device, the DCI carrying two BWP indexes.

In the embodiment of the disclosure, the DCI received by the terminal device carries a first BWP index and a second BWP index, and each BWP occupies N bits in the DCI. The second BWP index is configured to indicate a first BWP that is deactivated, and the first BWP index is configured to indicate a second BWP that is activated.

In S402, the terminal device performs activation processing or deactivation processing on the BWPs according to the DCI.

In some implementation manners, when values of the bits corresponding to the BWP index are in a preset state, it is indicated that no processing is performed on the BWP corresponding to the index. For example, when values of all the N bits of the first BWP index are 1, it is indicated that activation processing is not performed on the second BWP. When the values of all the N bits of the second BWP index are 1, it is indicated that deactivation processing is not performed on the first BWP. Of course, it may be set that the values of all the bits corresponding to the BWP index are 0 or set in another state, which indicates that no processing is performed on the BWP corresponding to the index.

In some embodiments, the first BWP includes a fourth information field, and the second BWP includes a fifth information field. When a value of the fourth information field is a first value, the terminal device performs activation processing on the second BWP, but does not perform deactivation processing on the first BWP. When a value of the fifth information field is a second value, the terminal device performs deactivation processing on the first BWP, but does not perform activation processing on the second BWP. Optionally, the first value is set to be 1, and the second value is set to be 0.

In the embodiment of the disclosure, the DCI received by the terminal device may further carry a plurality of BWP indexes. When the DCI carries at least two BWP indexes, the terminal device may make two or more BWP indexes in an activated state. In such a manner, use of at least two parameter sets may be supported. Therefore, when a plurality of types of services are transmitted in parallel, parameter sets may be optimized for different services respectively, which achieves higher flexibility in scheduling and increases the service processing speed. Moreover, when the BWPs are switched, the terminal may continue transmitting data, which avoids waste of a spectrum resource.

Preferred Embodiment 4

In S501, a terminal device receives DCI sent by a network device, the DCI carrying a bitmap.

In the embodiment of the disclosure, the bitmap carried in the DCI is configured to simultaneously activate and/or deactivate a plurality of BWPs.

In some implementation manners, the network device configures M BWPs for the terminal device. M is a positive integer greater than 1, or a positive integer greater than or equal to 1. In such case, DCI carries a bitmap with a length M, and each bit in the bitmap corresponds to a BWP. When a value of a bit in the bitmap is 1, it is indicated that the BWP corresponding to the bit is activated. When a value of a bit in the bitmap is 0, it is indicated that the BWP corresponding to the bit is deactivated.

In S502, the terminal device performs activation processing or deactivation processing on the BWPs according to the bitmap.

In some implementation manners, when a value of a bit in the bitmap is 1, the terminal device activates the BWP corresponding to the bit. When a value of a bit in the bitmap is 0, the terminal device deactivates the BWP corresponding to the bit.

Preferred Embodiment 5

In S601, a terminal device receives DCI sent by a network device.

In S602, the terminal device decodes the received DCI to obtain a scrambling sequence.

In the embodiment of the disclosure, the terminal device decodes the DCI according to a decoding manner predetermined with the network device to obtain the corresponding scrambling sequence.

In S603, the terminal device matches, based on the obtained scrambling sequence, a BWP index in a preset first mapping relationship between scrambling sequences and BWP indexes.

In the embodiment of the disclosure, the first mapping relationship between the scrambling sequences and the BWP indexes is preset, so that the terminal device may obtain the BWP index corresponding to the scrambling sequence in the first mapping relationship between the scrambling sequences and the BWP indexes.

In S604, deactivation processing or activation processing is performed on a BWP corresponding to the matched BWP index.

In some implementation manners, when the BWP corresponding to the matched BWP index is in a non-activated state, activation processing is performed on the BWP; and when the BWP corresponding to the matched BWP index is in an activated state, deactivation processing is performed on the BWP.

Preferred Embodiment 6

In S701, a terminal device receives DCI sent by a network device.

In S702, the terminal device decodes the received DCI to obtain a mask sequence.

In the embodiment of the disclosure, the terminal device decodes the DCI according to a decoding manner predetermined with the network device to obtain the corresponding mask sequence.

In S703, the terminal device matches, based on the obtained mask sequence, a BWP index in a preset second mapping relationship between mask sequences and BWP indexes.

In the embodiment of the disclosure, the second mapping relationship between the mask sequences and the BWP indexes is preset, so that the terminal device may obtain the BWP index corresponding to the mask sequence in the second mapping relationship between the mask sequences and the BWP indexes.

In S704, deactivation processing or activation processing is performed on a BWP corresponding to the matched BWP index.

In some implementation manners, when the BWP corresponding to the matched BWP index is in a non-activated state, activation processing is performed on the BWP; and when the BWP corresponding to the matched BWP index is in an activated state, deactivation processing is performed on the BWP.

Preferred Embodiment 7

In S801, a terminal device receives DCI sent by a network device.

In S802, the terminal device determines a control resource set bearing the DCI.

In S803, the terminal device matches, based on the control resource set, a BWP index in a preset third mapping relationship between control resource sets and BWP indexes.

In S804, the terminal device performs deactivation processing or activation processing on a BWP corresponding to the matched BWP index.

In some implementation manners, when the BWP corresponding to the matched BWP index is in a non-activated state, activation processing is performed on the BWP; and when the BWP corresponding to the matched BWP index is in an activated state, deactivation processing is performed on the BWP.

Preferred Embodiment 8

In S901, a terminal device receives DCI sent by a network device.

In S902, the terminal device determines a search space bearing the DCI.

In S903, the terminal device matches, based on the search space, a BWP index in a preset fourth mapping relationship between search spaces and BWP indexes.

In S904, deactivation processing or activation processing is performed on a BWP corresponding to the matched BWP index.

In some implementation manners, when the BWP corresponding to the matched BWP index is in a non-activated state, activation processing is performed on the BWP; and when the BWP corresponding to the matched BWP index is in an activated state, deactivation processing is performed on the BWP.

Preferred Embodiment 9

In S1001, a terminal device receives DCI sent by a network device.

In S1002, the terminal device determines a Demodulation Reference Signal (DMRS) sequence which is used by the DCI.

In S1003, the terminal device matches, based on the DMRS sequence, a BWP index in a preset fifth mapping relationship between DMRS sequences and BWP indexes.

In S1004, the terminal device performs deactivation processing or activation processing on a BWP corresponding to the BWP index.

In some implementation manners, when the BWP corresponding to the matched BWP index is in a non-activated state, activation processing is performed on the BWP; and when the BWP corresponding to the matched BWP index is in an activated state, deactivation processing is performed on the BWP.

According to the embodiment of the disclosure, activation or deactivation of the BWP is implemented by using different DMRS sequences in a search space or control resource set where the DCI is located.

An optional processing flow of a method for processing BWPs which is provided in the embodiments of the disclosure and applied to a network device includes the following operation.

The network device sends control information, the control information being configured for a terminal device to perform deactivation processing and/or activation processing on the BWPs.

In some embodiments, the control information is DCI, the DCI carries first indication information, and the first indication information is configured to indicate whether to perform deactivation processing on a first BWP when activating a second BWP. The first indication information includes a first information field, and a value of the first information field is configured to indicate that deactivation processing is performed on the first BWP or deactivation processing is not performed on the first BWP.

Or, the control information is DCI, the DCI carries second indication information, and the second indication information is configured to indicate that activation processing is performed on a second BWP and/or deactivation processing is performed on the first BWP. When the second indication information includes a second information field, a value of the second information field is configured to indicate that activation processing is performed on the second BWP and/or deactivation processing is performed on the first BWP. When the second indication information includes a third information field and the third information field is a bitmap, a value of each bit in the bitmap is configured to indicate that activation processing is performed on the second BWP and/or deactivation processing is performed on the first BWP.

Or, the DCI at least carries a first BWP index and a second BWP index, the second BWP index is configured to indicate that activation processing is performed on the second BWP, and the first BWP index is configured to indicate that deactivation processing is performed on the first BWP.

Or, when a value of a fourth information field included in the first BWP index is a first value, it is indicated that activation processing is performed on the second BWP; and when a value of a fifth information field included in the second BWP index is a second value, it is indicated that deactivation processing is performed on the first BWP.

Or, the control information is DCI, and a scrambling sequence corresponding to the DCI and a first mapping relationship between scrambling sequences and BWP indexes are configured to indicate that deactivation processing and/or activation processing are/is performed on a BWP corresponding to a BWP index.

Or, the control information is DCI, and a mask sequence corresponding to the DCI and a second mapping relationship between mask sequences and BWP indexes are configured to indicate that deactivation processing and/or activation processing are/is performed on the BWP corresponding to the BWP index.

Or, a control resource set where the control information is located and a third mapping relationship between control resource sets and BWP indexes are configured to indicate that deactivation processing and/or activation processing are/is performed on the BWP corresponding to the BWP index.

Or, a search space where the control information is located and a fourth mapping relationship between search spaces and BWP indexes are configured to indicate that deactivation processing and/or activation processing are/is performed on the BWP corresponding to the BWP index.

Or, a DMRS sequence used by the control information and a fifth mapping relationship between DMRS sequences and BWP indexes are configured to indicate that deactivation processing and/or activation processing are/is performed on the BWP corresponding to the BWP index.

Figure 4:
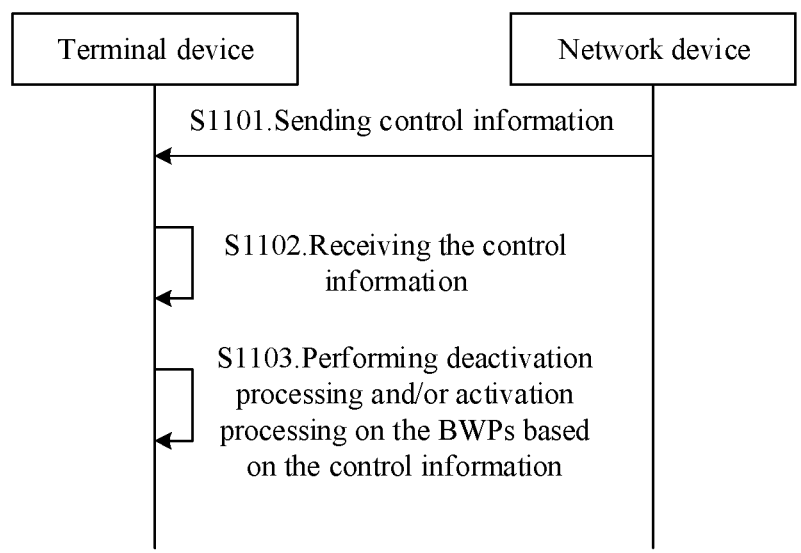
FIG. 4 is a schematic diagram of an optional processing flowchart of a method for processing BWPs which is applied to a communication system according to an embodiment of the disclosure.

FIG. 4 is a schematic diagram of an optional processing flowchart of a method for processing BWPs which is applied to a communication system according to an embodiment of the disclosure. The method includes the following steps.

In S1101, a network device sends control information to a terminal device.

Herein, the control information is configured for the terminal device to perform deactivation processing and/or activation processing on the BWPs.

In S1102, the terminal device receives the control information.

In S1103, the terminal device performs deactivation processing and/or activation processing on the BWPs based on the control information.

Herein, the BWP includes a first BWP and a second BWP. The first BWP is in an activated state, and the second BWP is in a non-activated state.

In the embodiment of the disclosure, the terminal device performs activation processing on a second BWP based on the control information. Or the terminal device, based on the control information, performs activation processing on the second BWP and performs deactivation processing on a first BWP. Or the terminal device performs deactivation processing on the first BWP based on the control information.

Through the technical solutions, the terminal device performs deactivation processing and/or activation processing on the BWPs based on the received control information, so that flexible BWP configuration may be implemented.

It is to be understood that, in all the abovementioned embodiments, when a certain BWP is in the activated state and the terminal device receives control information for deactivation of the BWP, the terminal device may perform deactivation processing on the BWP, and when the terminal device receives control information for activation of the BWP, the terminal device may perform activation processing on the BWP or the terminal device ignores the activation information.

It is to be understood that, in all the abovementioned embodiments, when a certain BWP is in a deactivated state and the terminal device receives control information for activation of the BWP, the terminal device may perform activation processing on the BWP, and when the terminal device receives control information for deactivation of the BWP, the terminal device may perform deactivation processing on the BWP or the terminal device ignores the deactivation information.

Figure 5:
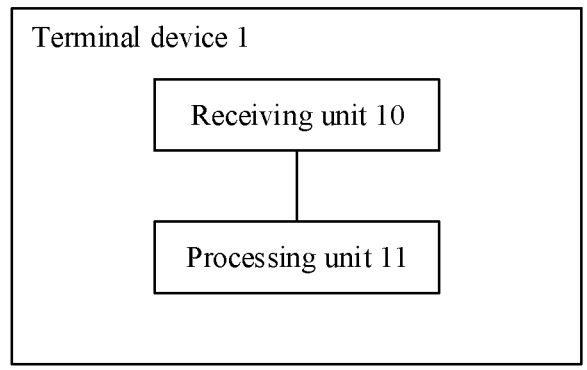
FIG. 5 is a schematic diagram of a composition structure of a terminal device according to an embodiment of the disclosure.

Based on the method for processing BWPs, the embodiments of the disclosure also provide a terminal device. A composition structure of the terminal device 1 is illustrated in FIG. 5.

A receiving unit 10 is configured to receive control information.

A processing unit 11 is configured to perform deactivation processing and/or activation processing on the BWPs based on the control information.

In an embodiment, the control information is DCI, the DCI carries first indication information, and the first indication information is configured to indicate whether to perform deactivation processing on a first BWP when activating a second BWP.

In an embodiment, the first indication information includes a first information field, and the processing unit is configured to, when activating the second BWP, perform deactivation processing on the first BWP or not perform deactivation processing on the first BWP based on a value of the first information field.

In an embodiment, the processing unit 11 is configured to, when the first information field is a first value, perform deactivation processing on the first BWP when activating the second BWP, and when the first information field is a second value, not perform deactivation processing on the first BWP when activating the second BWP.

In an embodiment, the processing unit 11 is configured to perform deactivation processing on the first BWP with an earliest activation time, or perform deactivation processing on the first BWP with a highest BWP index value, or perform deactivation processing on the first BWP with a lowest BWP index value, or perform deactivation processing on the first BWP with a minimum bandwidth, or perform deactivation processing on the first BWP with a maximum bandwidth, or perform deactivation processing on the first BWP bearing the DCI, or perform deactivation processing on the first BWP meeting a deactivation condition.

In an embodiment, the control information is DCI, the DCI carries second indication information, and the second indication information is configured to indicate that activation processing is performed on the second BWP and/or deactivation processing is performed on the first BWP.

In an embodiment, the second indication information includes a second information field, and the processing unit 11 performs activation processing on the second BWP and/or performs deactivation processing on the first BWP based on a value of the second information field.

In an embodiment, the processing unit 11 is configured to, when the second information field is the first value, perform activation processing on the second BWP, and when the second information field is the second value, perform deactivation processing on the first BWP.

In an embodiment, the second indication information includes a third information field, and when the third information field is a bitmap, the processing unit 11 is configured to perform activation processing on the second BWP and/or perform deactivation processing on the first BWP based on a value of each bit in the bitmap.

In an embodiment, the processing unit 11 is configured to, when the value of a bit is the first value, perform activation processing on the second BWP corresponding to the bit, and when the value of the bit is the second value, perform deactivation processing on the first BWP corresponding to the bit.

In an embodiment, the DCI at least carries a first BWP index and a second BWP index.

The processing unit 11 is configured to perform activation processing on the second BWP based on the second BWP index and perform deactivation processing on the first BWP based on the first BWP index.

In an embodiment, the processing unit 11 is configured to, when a value of a fourth information field included in the first BWP index is the first value, perform activation processing on the second BWP, and when a value of a fifth information field included in the second BWP index is the second value, perform deactivation processing on the first BWP.

In an embodiment, the control information is DCI, and the processing unit 11 is configured to decode the DCI to obtain a scrambling sequence, determine a BWP index based on the obtained scrambling sequence and a first mapping relationship, and perform deactivation processing and/or activation processing on a BWP corresponding to the BWP index, the first mapping relationship being a mapping relationship between scrambling sequences and BWP indexes.

In an embodiment, the control information is DCI, and the processing unit 11 is configured to decode the DCI to obtain a mask sequence, determine a BWP index based on the obtained mask sequence and a second mapping relationship and perform deactivation processing and/or activation processing on a BWP corresponding to the BWP index, the second mapping relationship being a mapping relationship between mask sequences and BWP indexes.

In an embodiment, the processing unit 11 is configured to determine a control resource set where the control information is located, determine a BWP index based on the control resource set and a third mapping relationship and perform deactivation processing and/or activation processing on a BWP corresponding to the BWP index, the third mapping relationship being a mapping relationship between control resource sets and BWP indexes.

In an embodiment, the processing unit 11 is configured to determine a search space where the control information is located, determine a BWP index based on the search space and a fourth mapping relationship and perform deactivation processing and/or activation processing on a BWP corresponding to the BWP index, the fourth mapping relationship being a mapping relationship between search spaces and BWP indexes.

In an embodiment, the processing unit 11 is configured to determine a DMRS sequence which is used by the control information, determine a BWP index based on the DMRS sequence and a fifth mapping relationship and perform deactivation processing and/or activation processing on a BWP corresponding to the BWP index, the fifth mapping relationship being a mapping relationship between DMRS sequences and BWP indexes.

Figure 6:
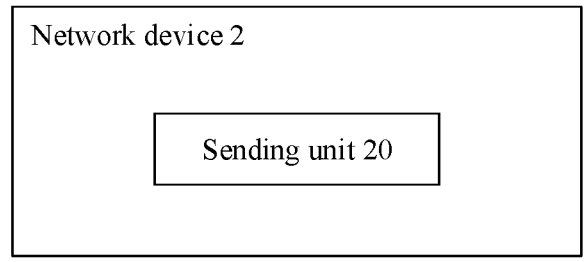
FIG. 6 is a schematic diagram of a composition structure of a network device according to an embodiment of the disclosure.

Based on the method for processing BWPs, the embodiments of the disclosure also provide a network device. A composition structure of the network device 2 is illustrated in FIG. 6.

A sending unit 20 is configured to send control information, the control information being configured for a terminal device to perform deactivation processing and/or activation processing on the BWPs.

In an embodiment, the control information is DCI, the DCI carries first indication information, and the first indication information is configured to indicate whether to perform deactivation processing on a first BWP when activating a second BWP.

In an embodiment, the first indication information includes a first information field, and a value of the first information field is configured to indicate that deactivation processing is performed on the first BWP or deactivation processing is not performed on the first BWP.

In an embodiment, the control information is DCI, the DCI carries second indication information, and the second indication information is configured to indicate that activation processing is performed on the second BWP and/or deactivation processing is performed on the first BWP.

In an embodiment, the second indication information includes a second information field, and a value of the second information field is configured to indicate that activation processing is performed on the second BWP and/or deactivation processing is performed on the first BWP.

In an embodiment, the second indication information includes a third information field, and when the third information field is a bitmap, a value of each bit in the bitmap is configured to indicate that activation processing is performed on the second BWP and/or deactivation processing is performed on the first BWP.

In an embodiment, the DCI at least carries a first BWP index and a second BWP index.

The second BWP index is configured to indicate that activation processing is performed on the second BWP, and the first BWP index is configured to indicate that deactivation processing is performed on the first BWP.

In an embodiment, when a value of a fourth information field included in the first BWP index is a first value, it is indicated that activation processing is performed on the second BWP.

When a value of a fifth information field included in the second BWP index is a second value, it is indicated that deactivation processing is performed on the first BWP.

In an embodiment, the control information is DCI, and a scrambling sequence corresponding to the DCI and a first mapping relationship between scrambling sequences and BWP indexes are configured to indicate that deactivation processing and/or activation processing are/is performed on a BWP corresponding to a BWP index.

In an embodiment, the control information is DCI, and a mask sequence corresponding to the DCI and a second mapping relationship between mask sequences and BWP indexes are configured to indicate that deactivation processing and/or activation processing are/is performed on the BWP corresponding to the BWP index.

In an embodiment, a control resource set where the control information is located and a third mapping relationship between control resource sets and BWP indexes are configured to indicate that deactivation processing and/or activation processing are/is performed on the BWP corresponding to the BWP index.

In an embodiment, a search space where the control information is located and a fourth mapping relationship between search spaces and BWP indexes are configured to indicate that deactivation processing and/or activation processing are/is performed on the BWP corresponding to the BWP index.

In an embodiment, a DMRS sequence used by the control information and a fifth mapping relationship between DMRS sequences and BWP indexes are configured to indicate that deactivation processing and/or activation processing are/is performed on the BWP corresponding to the BWP index.

Figure 7:
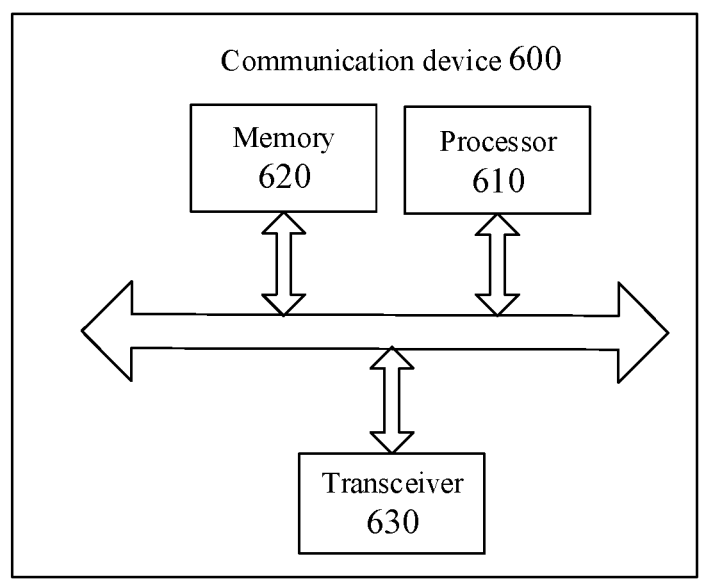
FIG. 7 is a schematic block diagram of a communication device according to an embodiment of the disclosure.

FIG. 7 is a schematic structure diagram of a communication device 600 according to an embodiment of the disclosure. The communication device 600 illustrated in FIG. 7 includes a processor 610, and the processor 610 may call and run a computer program in a memory to implement the methods in the embodiments of the disclosure.

Optionally, as illustrated in FIG. 7, the communication device 600 may further include the memory 620. The processor 610 may call and run the computer program in the memory 620 to implement the methods in the embodiments of the disclosure.

The memory 620 may be an independent device independent of the processor 610, or may be integrated into the processor 610.

Optionally, as illustrated in FIG. 7, the communication device 600 may further include a transceiver 630. The processor 610 may control the transceiver 630 to communicate with other devices. Specifically, the transceiver 630 sends information or data to other devices or receives information or data sent by other devices.

The transceiver 630 may include a transmitter and a receiver. The transceiver 630 may further include antennae, and the number of the antennae may be one or more.

Optionally, the communication device 600 may specifically be the mobile terminal/terminal device of the embodiments of the disclosure. The communication device 600 may implement corresponding flows implemented by the mobile terminal/terminal device in each method of the embodiments of the disclosure. For simplicity, elaborations are omitted herein.

Figure 8:
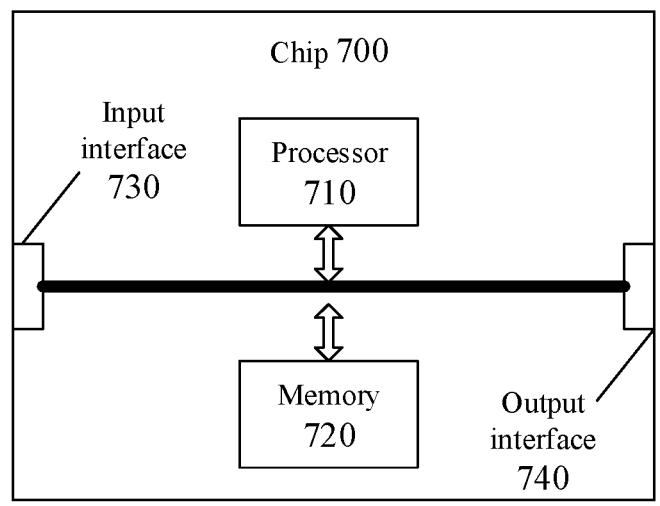
FIG. 8 is a schematic block diagram of a chip according to an embodiment of the disclosure.

FIG. 8 is a schematic structure diagram of a chip according to an embodiment of the disclosure. The chip 700 illustrated in FIG. 8 includes a processor 710, and the processor 710 may call and run a computer program in a memory to implement the methods in the embodiments of the disclosure.

Optionally, as illustrated in FIG. 8, the chip 700 may further include the memory 720. The processor 710 may call and run the computer program in the memory 720 to implement the methods in the embodiments of the disclosure.

The memory 720 may be an independent device independent of the processor 710, or may be integrated into the processor 710.

Optionally, the chip 700 may further include an input interface 730. The processor 710 may control the input interface 730 to communicate with other devices or chips. Specifically, the input interface 730 acquires information or data sent by other devices or chips.

Optionally, the chip 700 may further include an output interface 740. The processor 710 may control the output interface 740 to communicate with other devices or chips. Specifically, the output interface 740 outputs information or data to other devices or chips.

Optionally, the chip may be applied to the network device of the embodiments of the disclosure. The chip may implement corresponding flows implemented by the network device in each method of the embodiments of the disclosure. For simplicity, elaborations are omitted herein.

Optionally, the chip may be applied to the mobile terminal/terminal device of the embodiment of the disclosure. The chip may implement corresponding flows implemented by the mobile terminal/terminal device in each method of the embodiment of the disclosure. For simplicity, elaborations are omitted herein.

It is to be understood that the chip mentioned in the embodiment of the disclosure may also be called a system-level chip, a system chip, a chip system or a system-on-chip chip, etc.

Figure 9:
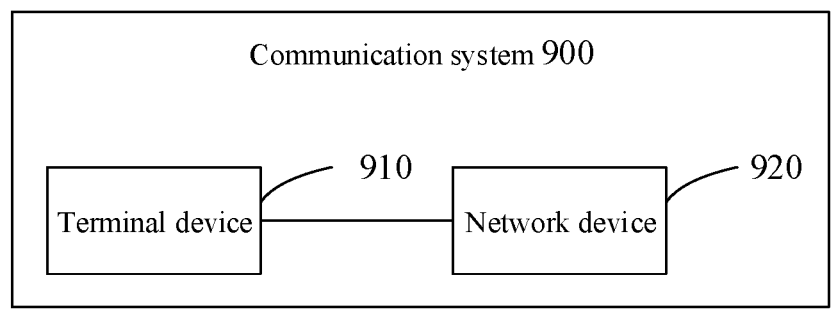
FIG. 9 is a schematic block diagram of a communication system according to an embodiment of the disclosure.

FIG. 9 is a schematic block diagram of a communication system 900 according to an embodiment of the disclosure. As illustrated in FIG. 9, a communication system 900 includes a terminal device 910 and a network device 920.

The terminal device 910 may be configured to realize corresponding functions realized by the terminal device in the method, and the network device 920 may be configured to realize corresponding functions realized by the network device in the method. For simplicity, elaborations are omitted herein.

It is to be understood that the processor in the embodiment of the disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory. The processor reads information in the memory, and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM.

That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The invention claimed is:

1. A method for processing Bandwidth Parts (BWPs), comprising:
receiving, by a terminal device, Downlink Control Information (DCI), the DCI carrying indication information; and
performing, by the terminal device, activation processing on a second BWP and deactivation processing on a first BWP based on an information field of the indication information;
wherein the indication information comprises first indication information, the first indication information comprises a first information field, the first information field is 1-bit, and the terminal device performs activation processing on the second BWP and deactivation processing on the first BWP based on a value of the first information field;
wherein performing, by the terminal device, activation processing on the second BWP and deactivation processing on the first BWP based on the information field of the indication information comprises:
if the first information field is a first value, performing, by the terminal device, deactivation processing on the first BWP when activating the second BWP;
wherein the second BWP comprises a plurality of BWPs, and performing activation processing on the second BWP comprises activating the plurality of BWPs simultaneously; and wherein the first BWP comprises a plurality of BWPs, and performing deactivation processing on the first BWP comprises deactivating the plurality of BWPs simultaneously.

2. The method of claim 1, wherein performing deactivation processing on the first BWP comprises:
performing deactivation processing on the first BWP meeting a deactivation condition.

3. A method for processing a Bandwidth Parts (BWPs), comprising:
sending, by a network device, Downlink Control Information (DCI), the DCI carrying indication information, and an information field of the indication information being configured for a terminal device to perform activation processing on a second BWP and deactivation processing on a first BWP;
wherein the indication information comprises first indication information, the first indication information comprises a first information field, the first information field is 1-bit, and a value of the first information field is configured to indicate that deactivation processing is performed on the first BWP when activating the second BWP;
wherein the second BWP comprises a plurality of BWPs, and the plurality of BWPs are activated simultaneously; and
wherein the first BWP comprises a plurality of BWPs, and the plurality of BWPs are deactivated simultaneously.

4. A terminal device, comprising a memory, a transceiver and a processor, wherein
the memory is configured to store a software program capable of running on the processor; and
the transceiver is configured to receive Downlink Control Information (DCI), the DCI carrying indication information; and
the processor is configured to perform activation processing on a second Bandwidth Part (BWP) and deactivation processing on a first BWP based on an information field of the indication information;
wherein the indication information comprises first indication information, the first indication information comprises a first information field, the first information field is 1-bit, and the processor is configured to perform activation processing on the second BWP and deactivation processing on the first BWP based on a value of the first information field;
wherein the processor is configured to, if the first information field is a first value, perform deactivation processing on the first BWP when activating the second BWP;
wherein the second BWP comprises a plurality of BWPs, and performing activation processing on the second BWP comprises activating the plurality of BWPs simultaneously; and
wherein the first BWP comprises a plurality of BWPs, and performing deactivation processing on the first BWP comprises deactivating the plurality of BWPs simultaneously.

5. The terminal device of claim 4, wherein the processor is configured to
perform deactivation processing on the first BWP meeting a deactivation condition.

6. A network device, comprising a memory, a transceiver and a processor, wherein
the memory is configured to store a software program capable of running on the processor; and
the transceiver is configured to send Downlink Control Information (DCI), the DCI carrying indication information, and an information field of the indication information being configured for a terminal device to perform activation processing on a second Bandwidth Part (BWP) and deactivation processing on a first BWP;
wherein the indication information comprises first indication information, the first indication information comprises a first information field, the first information field is 1-bit, and a value of the first information field is configured to indicate that deactivation processing is performed on the first BWP when activating the second BWP;
wherein the second BWP comprises a plurality of BWPs, and the plurality of BWPs are activated simultaneously; and
wherein the first BWP comprises a plurality of BWPs, and the plurality of BWPs are deactivated simultaneously.

* * * * *